March 16, 1965     W. H. BATEMAN     3,173,335
MEANS FOR CONTROLLING THE ACTIONS OF MACHINE TOOLS
Filed April 20, 1961

United States Patent Office 3,173,335
Patented Mar. 16, 1965

3,173,335
MEANS FOR CONTROLLING THE ACTIONS OF MACHINE TOOLS
William Henry Bateman, Loudwater, Rickmansworth, England, assignor to Wickman Limited, Coventry, England
Filed Apr. 20, 1961, Ser. No. 104,237
Claims priority, application Great Britain, Apr. 26, 1960, 14,540/60
4 Claims. (Cl. 90—13)

It is already well known to effect the control of the actions of a machine tool in successive cycles of operation, by automatic means responsive to the control of a coded tape or the like. When the machine is required to produce similar articles in large numbers, the cost of such control means is economically justifiable. But when small numbers are required the cost may neutralise the advantages, in which case the normal procedure is to effect control of the machine solely by an attendant.

There remains, however, an intermediate condition in which the employment of means for effecting partial automatic control can be advantageous, and the object of the present invention is to enable requirement to be met in a satisfactory manner.

A method in accordance with the invention comprises using a coded tape or tapes, or the like in part to control selected actions of the machine tool, and in part to control audible or visible means for instructing an attendant to perform other actions.

A means according to the invention comprises means for controlling selected actions of the machine tool in accordance with a code on a coded tape, or the like, and further means for giving audible or visual instructions to an attendant to perform other actions, said further means being controlled by said tape or the like, or by a further tape or the like controlled by the first mentioned tape or the like.

In one example a coded tape T or alternatively a rotary disc or the like is adapted either by a magnetic record or by perforations to control electric circuits associated with means for performing automatically certain selected movements of the machine tool in each cycle or action. In addition a part of the code such as at 1 is adapted to control means 2 for giving audible or visible instructions to the attendant to effect manual movements of the machine, such as changes of speed or feed rates, or changes of the tools to be brought into action.

In an alternative embodiment of the invention two coded tapes or the like are employed. One of them is provided with a code for effecting automatic control of the machine tool, and also with a code such as at 3 to control an electric motor 4 for intermittently starting and stopping a second tape $T_2$ or the like which is driven by said electric motor. The second tape or the like is coded to control the audible or visible instructions 5 required by the attendant.

Figure 1:
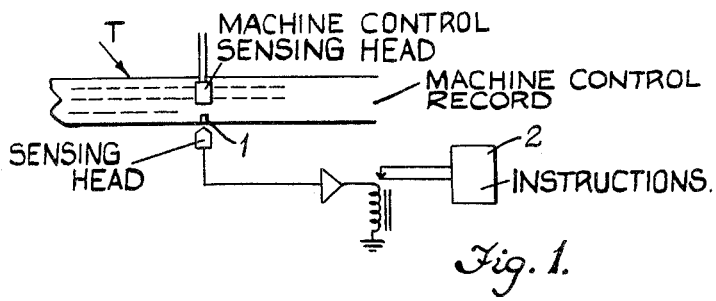
FIG. 1 is a diagrammatic showing of one form of the invention.
Figure 2:
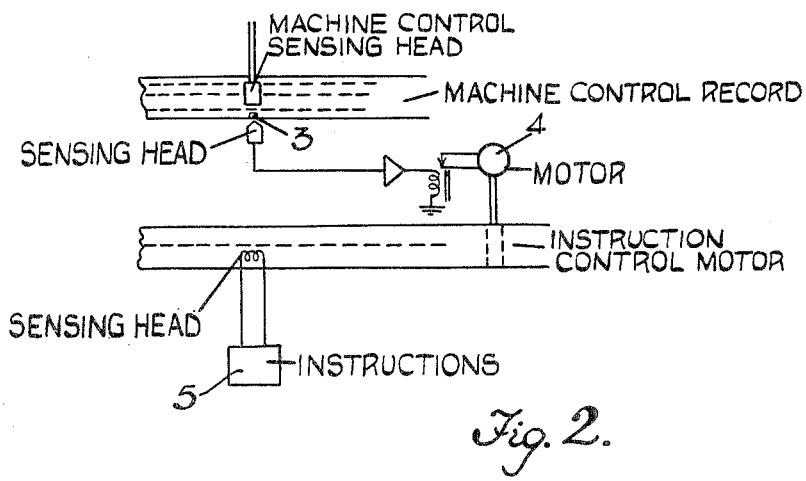
FIG. 2 is a diagramamtic showing of another form of the invention.

In both arrangements as shown in FIGS. 1 and 2, the instructions may be in the form of signs or recorded speech signals and may also be signals to indicate to the machine attendant that he should operate a speech re- producing machine provided for that purpose and which has a record upon which detailed instructions had been previously recorded as to the manner of controlling the machine tool at this point. With such separately recorded audible instructions, the attendant can replay the instructions at will in the event he cannot understand them the first time.

By this invention semi-automatic control of a machine can be provided in an advantageous manner.

Having thus described my invention what I claim as new and desire to secure by Letters Patent is:

1. A semiautomatic machine tool control system comprising a record having recorded thereon a first set of coded signals for controlling the automatic operations of a machine tool in successive cycles of operation and a second set of signals, a device independent of the record and operative to impart instructions to an attendant for the machine to effect manual movements of the machine tool, and means controlled by the second set of signals on the record for rendering the independent device operative to impart the instructions.

2. A semiautomaitc machine tool control system comprising a first record having recorded thereon a first set of coded signals for controlling the automatic operations of a machine tool in successive cycles of operation and a second set of signals recorded thereon, a second movable record having recorded signals thereon, means controlled by the signals on the second record for imparting instructions to an attendant for the machine to effect manual movements of the machine tool, and means controlled by the second set of signals on the first record for starting and stopping the movement of the second record to render the signals thereon effective to operate the said instruction means.

3. In combination with a first record having coded signals thereon for controlling automatic operations of a machine tool in successive cycles, a second record independent of the first record and having recorded thereon audible instructions to be carried out manually by a machine attendant, and additional signals upon the first record for rendering the second record operable to impart the instructions at selected positions in the cycle of operations of the machine tool.

4. In combination with a first record having coded signals thereon for controlling automatic operations of a machine tool in successive cycles, a second record independent of the first record and having recorded thereon audible instructions to be carried out manually by a machine attendant, and additional signals upon the first record for operating the second record to impart the instructions to a machine attendant.

References Cited by the Examiner
UNITED STATES PATENTS 2,213,108 8/40 Pollard.
2,684,746 7/54 Bakelaar et al. _____ 235—61.9 X
2,918,662 12/59 Cox et al. _____ 340—172.5

OTHER REFERENCES

Giddings and Lewis: Numericord Bulletin NR–1, 12 pages; received in U.S. Patent Office September 12, 1955.

WILLIAM W. DYER, Jr., *Primary Examiner.*
LEON PEAR, *Examiner.*